US006262808B1

(12) United States Patent
Hermann

(10) Patent No.: US 6,262,808 B1
(45) Date of Patent: Jul. 17, 2001

(54) MULTICOLOR PRINTING PROCESS, ESPECIALLY A MULTICOLOR GRID SCREEN PRINTING PROCESS FOR TEXTILE SUBSTRATES

(75) Inventor: Hanspeter Hermann, Lörrach-Hauingen (DE)

(73) Assignee: Ciba Specialty Chemiclas Corporation, Tarrytown, NY (US)

( * ) Notice: Subject to any disclaimer, the term of this patent is extended or adjusted under 35 U.S.C. 154(b) by 0 days.

(21) Appl. No.: 08/036,650

(22) Filed: Mar. 24, 1993

(30) Foreign Application Priority Data

Mar. 30, 1992 (EP) .............................................. 92810232

(51) Int. Cl.[7] ................................................ G06F 15/00
(52) U.S. Cl. ........................................................ 358/1.9
(58) Field of Search .................................. 395/101, 103, 395/109, 117; 358/298, 504, 517; 434/98; 364/526

(56) References Cited

U.S. PATENT DOCUMENTS

| | | | | |
|---|---|---|---|---|
| 4,395,116 | * | 7/1983 | Patton, III et al. | 355/32 |
| 4,629,428 | * | 12/1986 | Phillips | 434/98 |
| 4,829,898 | * | 5/1989 | Wieland | 101/483 |
| 4,878,977 | | 11/1989 | Kueppers | 156/264 |
| 4,901,254 | * | 2/1990 | Dolezalek et al. | 364/526 |
| 4,975,862 | * | 12/1990 | Keller et al. | 364/526 |
| 5,170,257 | * | 12/1992 | Burns | 358/298 |
| 5,182,721 | * | 1/1993 | Kipphan et al. | 364/526 |
| 5,202,959 | * | 4/1993 | Phillips | 395/109 |
| 5,255,350 | * | 10/1993 | Hermann et al. | 395/109 |
| 5,317,425 | * | 5/1994 | Spence et al. | 358/504 |
| 5,333,069 | * | 7/1994 | Spence | 358/517 |

FOREIGN PATENT DOCUMENTS

| | | | | |
|---|---|---|---|---|
| 3707027 | | 9/1988 | (DE) . | |
| 119836 | | 9/1984 | (EP) . | |
| 446168 | | 9/1991 | (EP) . | |
| 4992861 | * | 2/1991 | (RU) | 358/75 |
| 4537470 | * | 8/1985 | (SU) | 350/317 |
| 8702455 | | 4/1987 | (WO) . | |
| 8912552 | * | 12/1989 | (WO) | B41J/3/18 |
| 9112500 | | 8/1991 | (WO) . | |

* cited by examiner

*Primary Examiner*—Garcia Gabriel
(74) *Attorney, Agent, or Firm*—David R. Chrichton; Kevin T. Mansfield

(57) ABSTRACT

There is printed on the same substrate on which the design is to be printed and under identical printing conditions a colour atlas that comprises a number of colour charts each of which comprises a number of colour fields that represent the printing one on top of another of three selected printing inks from a limited set of predetermined printing inks with different grades of the grid percentages of the grid screen printing stencils for the three printing inks, which stencils form the basis of the printing operation. The printing original is divided into a large number of, especially punctiform, image areas, and the colour impression is determined for each of those areas. The grid percentages of the grid screen printing stencils are determined for each area by comparison with the colour fields of the colour atlas. The necessary grid films are produced with reference to those grid percentages, and the grid screen printing stencils for the printing inks involved are produced from the grid films. The design is printed in a screen printing machine using the grid screen printing stencils so produced.

12 Claims, 3 Drawing Sheets

MULTICOLOR PRINTING PROCESS, ESPECIALLY A MULTICOLOR GRID SCREEN PRINTING PROCESS FOR TEXTILE SUBSTRATES

FIELD OF THE INVENTION

The invention relates to a multicolour printing process for textile substrates.

BACKGROUND OF THE INVENTION

While multicolour printing on paper and comparable substrates can today be essentially regarded as quite feasible, the person skilled in the art is still faced with great difficulties in the case of the multicolour printing of textile substrates if the printing involves difficult designs or colour tones or if the printed colours are required to have a high degree of brilliancy.

In general, the screen printing process is used for printing on textile substrates. In that process, each printing ink involved in the printing process requires its own screen printing stencil. Screen printing stencils may be completely open or, in order to obtain half-tones, they may also be in grid-form analogously to grid printing plates in offset printing; the term used in the latter case is grid screen printing stencils. The grid percentage of a grid screen printing stencil is, again analogously to offset printing, the ratio of the open area to the entire surface area of a notional elemental area of the grid screen printing stencil.

When printing on paper and comparable substrates, the entire design to be printed is made up of a limited set of, as a rule, four standard printing inks (generally cyan, yellow, magenta and black). The case of special colours is of no importance with regard to the following and has accordingly not been taken into account. The printing original carrying the design to be printed is scanned photoelectrically picture element by picture element by a lithographic scanning device, and so-called colour separations are established (nowadays electronically by digital image-processing) from the measurement data obtained, which separations represent the amounts of the four standard printing inks in the design. Those colour separations are then used to produce grid films which serve to produce the individual printing plates for the four printing inks involved.

That procedure, which has proved successful in offset printing (and, in a slightly modified form, also in intaglio and flexo printing), can be used at best to only a limited extent on textile substrates owing to the completely different colour build-up and in most cases gives highly unsatisfactory printing results. Accordingly, other methods are normally used for the multicolour printing of textile substrates.

The printing original or the design to be printed carried thereon is split into individual areas with each of which is associated an individual printing ink that is as close as possible to the actual colour tone. A screen printing stencil that is open in all of the areas of the design that belong to the printing ink in question is then produced for each of the printing inks provided. Nowadays, the production of the screen printing stencils is likewise effected using photoelectric image-scanning devices (lithographic scanners) supported by digital image-processing with devices analogous to those used in the production of offset printing plates.

For reasons of cost and for reasons of practicability, there is in practice a limit to the number of printing inks that can be used in this process. On the one hand the production of screen printing stencils is time-consuming and accordingly expensive per se and, on the other, customary screen printing arrangements are not generally set up for more than approximately ten printing inks. In practice, therefore, the process is subject to limitations which often lead to unsatisfactory printing results, especially if a relatively high reproduction quality is required. In addition, special effects, such as, for example, finely graded colour tone variations or shades and 3D effects, cannot be achieved or are difficult to achieve with this known process. Furthermore, critical colour tones, such as, for example, skin colours, cannot be produced with this process without streaking.

SUMMARY OF THE INVENTION

The present invention is intended to overcome these difficulties and limitations in the printing of textile substrates and so to improve a process of the generic type defined in the preamble of the independent claim that a considerable improvement in reproduction quality and an enhanced brilliancy of the printed colour tones can be achieved in conventional screen printing apparatuses, and special effects, such as shading, finely graded colour tone variations, 3D effects, etc., can also be obtained without substantial additional outlay. Another problem of the invention is to achieve those advantages also in other printing processes for textile substrates, for example an ink-jet grid printing process.

The process according to the invention which solves that problem is characterised by the features of the independent claims. Advantageous developments and forms of the process are indicated in the dependent claims.

The process according to the invention is explained in more detail hereinafter in conjunction with the drawings, especially with reference to the example of a grid screen printing process. In the drawings:

DETAILED DESCRIPTION OF PREFERRED EMBODIMENTS OF THE INVENTION

Figure 1:
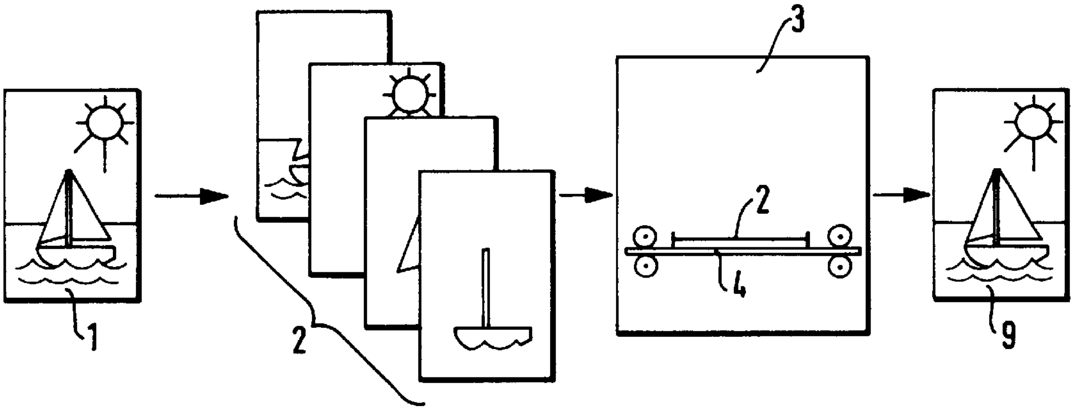
Fig. 1 PRIOR ART
FIG. 1 is a general diagrammatic view of the most important stages of a screen printing process.

The basic course of a (grid) screen printing process is shown in FIG. 1. A printing original 1 carries the design to be printed, in this case, for example, in the form of a sailing boat with sun. A (grid) screen printing stencil 2 is produced from that printing original 1 for each of the printing inks to be used in the printing operation. These stencils 2 are then conveyed to a multicolour screen printing apparatus 3 in which the, for example, textile substrate 4 is printed with the individual printing inks in accordance with the stencils 2. The substrate resulting from this procedure and printed with the design of the printing original 1 is marked 9. Thus far, the process according to the invention is exactly the same as conventional processes, so that no further explanation is necessary in this connection.

Figure 2:
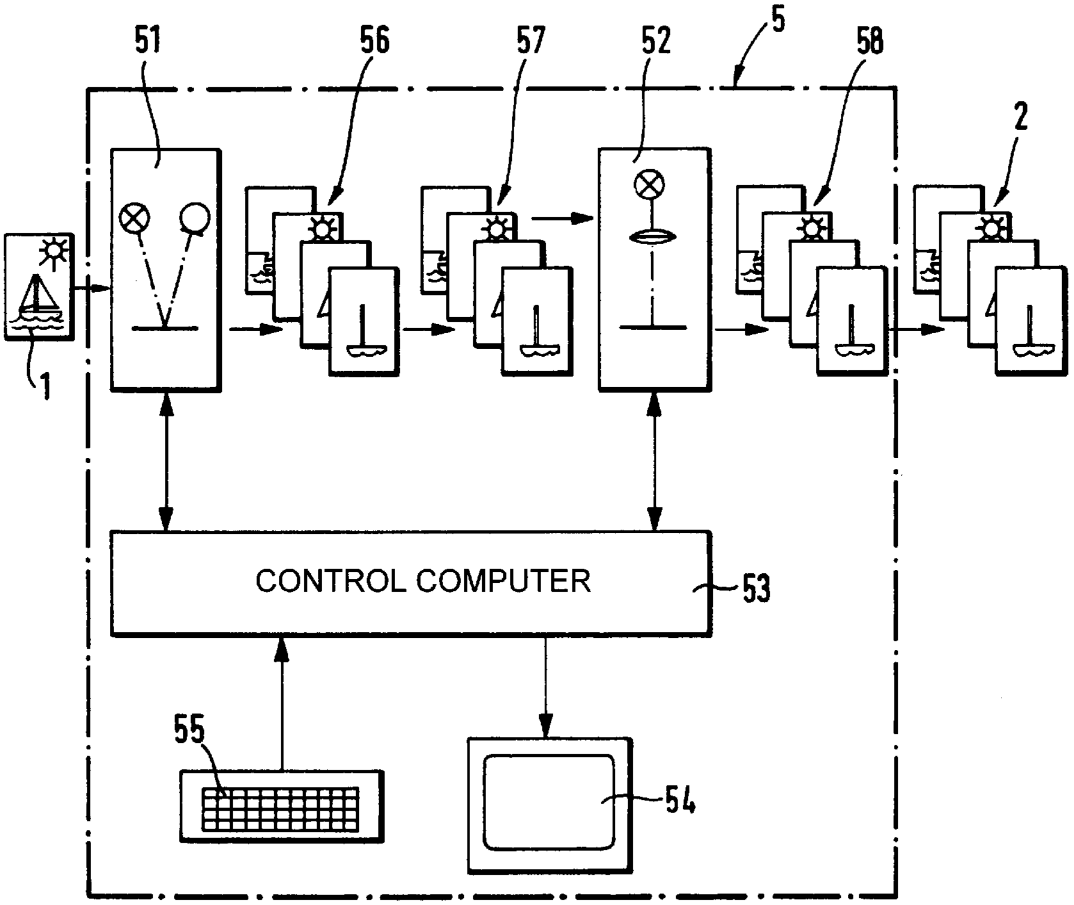
FIG. 2 is a general scheme of the most important stages in the production of grid screen printing stencils.

FIG. 2 shows in diagrammatic form the typical steps required for the production of the screen printing stencils 2, those steps being such as result from the use of a now customary computer-controlled lithographic grid film exposure apparatus 5. The exposure apparatus 5 typically comprises essentially a photoelectric scanning system 51 and an exposure system 52 and also a control computer 53 that controls those two systems and produces the connection to the operator and has the customary input and display units 54 and 55 for interactive communication with the operator. A typical known grid film exposure apparatus of that type, which is used worldwide in lithographic businesses, is, for example, marketed by Scitex. For the sake of easier understanding, the following relates to that known apparatus. It will be understood, however, that the process according to the invention is in no way limited to the use of that specific apparatus or to the use of a grid film exposure apparatus at all.

The scanning system 51 reads the design of the printing original 1 into the apparatus 5. In this operation, the printing original or the design is measured (scanned) photoelectrically picture element by picture element (pixel), generally either in standard colour channels (typically red, green, blue and visual or infrared in accordance with the standard printing inks cyan, magenta, yellow and neutral black) or in a number of more or less narrow spectral ranges. The totality of the measurement data produced represents the design in electronically stored form. From the data read in, the computer 53 produces in accordance with customary methods of electronic image-processing, either fully automatically or by interaction with the operator (in electronic form) colour separations 56 that reflect the amounts of the individual printing inks, used in the printing operation, in the total design. The colour separations 56 can be displayed on the image screen 54 and the operator can make corrections to individual picture elements by means of the input unit 55 (keyboard, mouse, graphics tablet, etc.).

In the exposure system 52, grid films 58 for each of the printing inks involved in the printing operation are then produced on the basis of the colour separations 56. For that purpose, for each printing ink involved, the control computer 53 calculates from the data of the associated colour separation 56 the necessary grid percentage $R_i$ of the grid film for each individual picture element of the design and, from that, the necessary exposure data for the relevant picture element of the grid film on the basis of standard printing conditions or printing conditions defined, for example, by appropriate parameter inputs. The totality of the grid percentages $R_i$ that govern the exposure of the grid films 58 is symbolised in FIG. 2 by grid separations 57 (of course only in the form of data). In this step too, the operator can exercise an interactive influence because he/she can, for example, enter corrections or even enter the grid percentages $R_i$ for individual or all picture elements. As will be explained in more detail below, the process according to the invention exploits precisely that possibility.

In a final step, the grid screen printing stencils 2 for the individual printing inks involved in the printing operation are then produced from the grid films 58 in accordance with known standard methods. This is effected in an entirely conventional manner, for example as indicated in the company publication "SST—a handbook for the screen printer" produced by Schweiz. Seidengazefabrik AG, CH-9425 Thal, and therefore requires no further explanation.

The screen printing stencils can of course also be produced in accordance with classical (for example photographic) methods of lithography by customary manipulation of the films.

As already stated at the beginning, those known methods of producing the screen printing stencils give satisfactory printing results when using paper or comparable substrates. In the case of textile substrates, the result is generally satisfactory only if the design of the printing original is so split into separate areas that only one single printing ink from a number of different available printing inks is associated with each separate area, so that each of those separate areas is then later printed with only one single printing ink, in other words, the inks are not printed one on top of another. Since, for reasons of practicability, there is a limit to the number of printing inks, the variety of colour tones and shadings achievable in printing is, as a result, considerably restricted. This problem is eliminated by the process measures according to the invention explained in more detail hereinafter.

Figure 3:
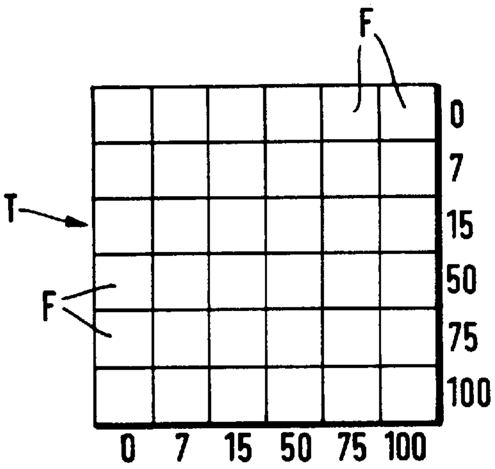
FIG. 3 shows a colour chart of a colour atlas.

As the first basic step in the process according to the invention, a set of calibration prints referred to hereinafter as a colour atlas is produced on the same textile substrate on which the design is to be printed, this being effected under exactly the same printing conditions as those applied later during the printing of the design. The colour atlas A (FIG. 4) comprises a number of colour charts T that is dependent on the number of printing inks from a limited set of printing inks selected in accordance with criteria to be explained later. As shown in FIG. 3, each of the colour charts comprises a, for example, square arrangement of a large number of individual colour fields F. Each colour field F within a colour chart T represents the printing one on top of another of a maximum of three printing inks, which are always the same for one and the same colour chart, with different amounts of the three inks. The amount of one of the three inks is constant within a colour chart (0–100%) and the amount of each of the other two inks varies in steps between 0 and 100%. A number of colour charts corresponding to the number of desired grades is accordingly necessary in order to represent all of the combinations of the printing of three printing inks one on top of another.

In order to print the colour fields F or the colour charts T of the colour atlas A, two types of grid screen printing stencils are produced according to any method known per se. One type has constant grid percentages of different grades over its entire area. The other type contains strip-shaped zones of grid percentages that are in each case constant but differ from one another in their grades. It is obvious that all of the colour charts T of the colour atlas A can be printed with those two types of screen printing stencils. The grades of the grid percentages of the screen printing stencils are advantageously selected so as to produce a substantially linearly graded tone value variation of the individual colours in the printed colour fields F. Since, unlike the case of paper and comparable substrates, the tone value variation is not linear in the case of textile substrates and depends on a number of influencing factors, the grades of the grid percentages have to be determined empirically by trying various values. For example, a grade series of grid percentages of 100, 70, 50, 35, 25, 15, 10, 7, 4, 2, 0 (% in each case) has in practice proved suitable in many cases. With that grade series, each colour chart T comprises 11*11=121 different colour fields F. The total ink application is limited preferably to, for example, 250%, so that the third printing ink is present in only a small number of tone value grades. In the example taken, those grades are 9 in number, with the corresponding grid percentages 50, 35, 25, 15, 10, 7, 4, 2 and 0 (% in each case). If the grid percentage of the screen printing stencil is 0% in the case of one or two of the printing inks, of which there are always three, then only two inks are printed one on top of the other or only one ink is printed. If all three grid percentages are 0%, then the colour field in question is an unprinted substrate.

Figure 6:
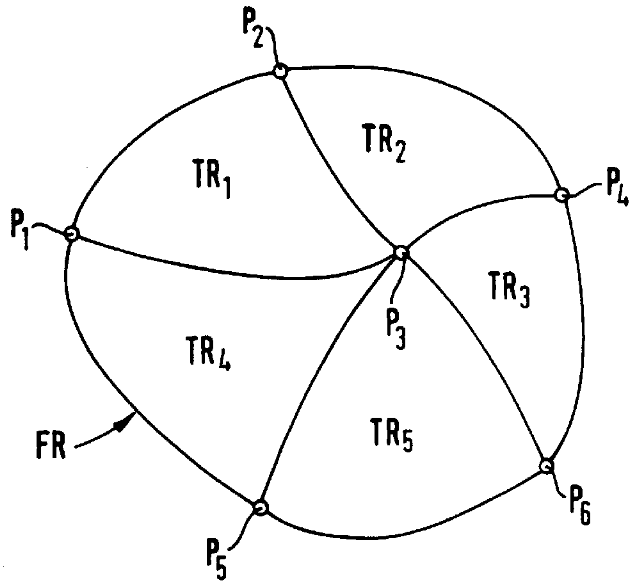

The selection of the printing ink triplets from the limited set of printing inks available is so carried out, preferably in accordance with the criteria described in, for example, EP-A-0 446 168, that the individual separate segments, defined by the superimposed printing of the three printing inks of the particular printing ink triplet, of the printable colour space, which can be represented with all of the printing inks, do not overlap each other, as can be seen in FIG. 6 which shows a representative section through a typical colour space, as described, for example, in the mentioned EP-A-0 446 168. The complete colour space is marked FR therein and the separate areas which, in section, are substantially triangular, have the reference symbols $TR_1$–$TR_5$. In the sectional plane shown, each of the points $P_1$–$P_6$ represents the colour location of one individual printing ink, of which there are in this case a total of six. More detailed information can be found in the mentioned EP-A-0 446 168.

The colour fields F of the colour atlas A printed in accordance with the above accordingly represent the entire colour space, producible with the selected set of printing inks, in discrete grades. Each colour field F represents a defined colour location (colour impression) within the colour space, and there are known for each colour field F the grid percentages $R_i$, necessary under the basic printing conditions in order to achieve the relevant colour impression, in the associated grid screen printing stencils for the particular three printing inks. The associations of colour impressions (colour locations) and grid percentages of the screen printing stencils established in that manner for the basic printing conditions and for the chosen substrate are then used within the scope of the process according to the invention for the production of the grid screen printing stencils required for printing the design.

Figure 4:
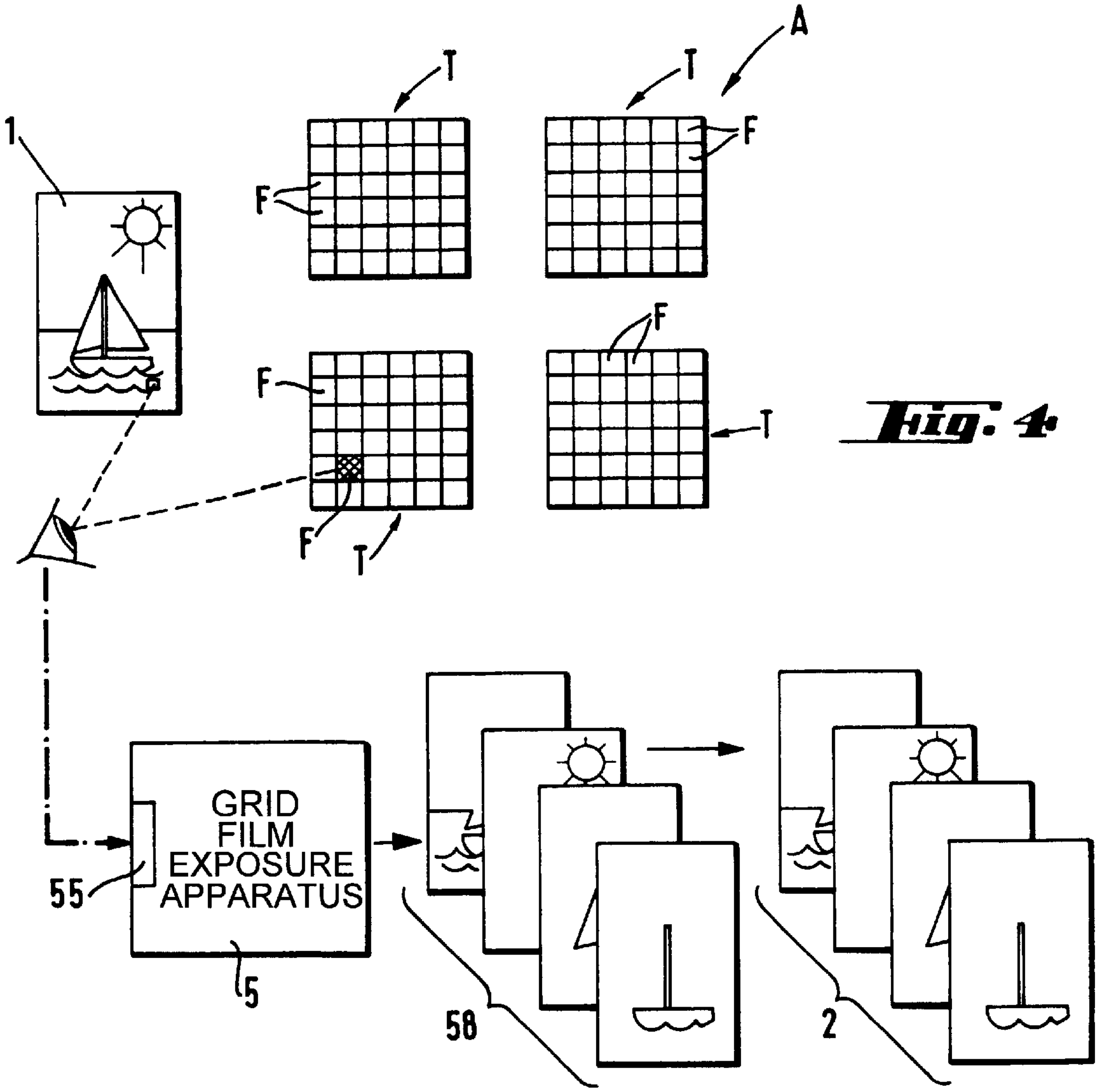
FIG. 4 shows a basic scheme of an embodiment of the process according to the invention.
Figure 5:
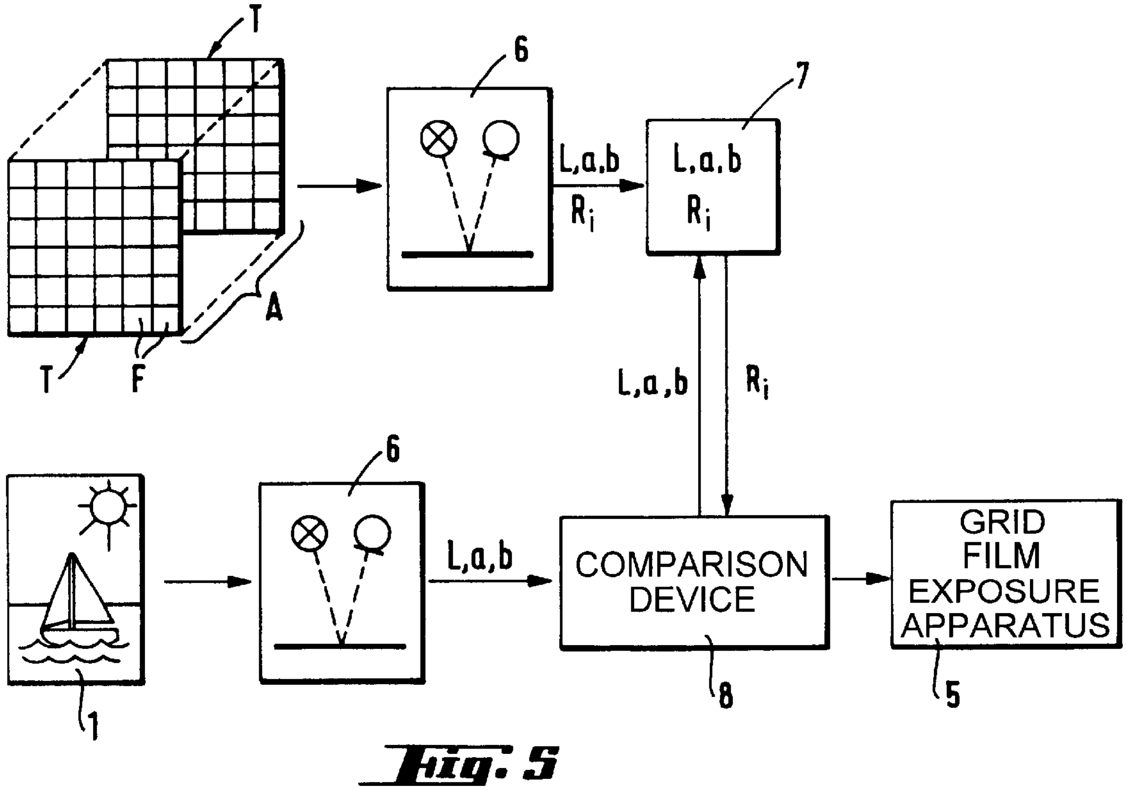
FIG. 5 is a diagrammatic representation of a modified embodiment of the process according to the invention and FIG. 6 shows diagrammatically a plane of a colour space in order to clarify the selection criteria for the printing inks.

According to the simplest embodiment of the process according to the invention shown diagrammatically in FIG. 4, the printing original 1 with the design carried thereon is compared visually with the colour atlas A for each of the picture elements. A picture element is to be understood as being a more or less large area of the printing original, preferably a punctiform area. The size of the (punctiform) area depends on the resolving power of the lithographic grid film exposure apparatus used. The colour impression of each picture element of the printing original 1 is determined visually and the colour field F that is the closest to that colour impression is established in the colour atlas A. The data associated with that colour field and relating to the maximum of three printing inks involved, and the associated grid percentages, are then entered into the control computer 53 of the grid film exposure apparatus 5 by means of the input device 55 and the picture elements are "formulated". When the data for all of the picture elements of the printing original have been entered in that manner, the grid film exposure apparatus 5 produces the grid films 58 for the individual printing inks on the basis of the grid percentages entered. The grid screen printing stencils 2 for printing the design are then produced therefrom in the manner already explained FIG. 5 shows the diagrammatic course of an expansion of the process according to the invention. In that embodiment, the colour impressions of the individual fields F of the colour atlas A are detected by a measuring technique using a colour-measuring device 6 and the colour value data established for each colour field, in association with the corresponding data relating to the printing inks involved, and the grid percentages $R_i$ for those printing inks are deposited in a, preferably electronic, memory 7. Suitable colour value data are especially the co-ordinates of a colour co-ordinate system, such as, for example, the L,a,b system or the L,u,v system according to the CIE (Commission Internationale de l'Eclairage).

The colour impressions (colour locations) of the individual picture elements of the printing original 1 are also detected as colour value data in an analogous manner by a measuring technique using a colour-measuring device 6. The colour value data of the individual picture elements of the printing original are then conveyed (manually or automatically) to a comparison device 8 which is connected to the memory 7 and, for each picture element of the printing original, reads the corresponding grid percentages $R_i$ out of the memory 7 on the basis of the colour value data conveyed to it. Those grid percentages are then conveyed, again either manually or, preferably, automatically, to the grid film exposure apparatus which produces the corresponding grid films therefrom.

There may be used as the colour-measuring device 6 a device that is to be positioned manually on the individual picture elements of the printing original 1 or on the individual colour fields F of the colour atlas A or, preferably, a scanning device, which device effects the positioning and measurement automatically. For example, the scanning system 51 which is already accommodated in the grid film exposure apparatus 5 itself can be used for the purpose. In addition, the memory 7 and the comparison device 8 may also be constituted by the control computer 53 of the grid film exposure apparatus 5. It is, of course, also possible to implement the process according to the invention using other apparatuses.

The process according to the invention is in no way limited to the grid screen printing technique explained by way of example above but can be used as well in other printing techniques, especially picture element orientated printing techniques, especially, for example, also in connection with so-called ink-jet printing apparatuses.

So-called ink-jet printing apparatuses or ink-jet printers have a number of fine jets corresponding to the number of printing inks to be used, from which jets the printing inks are squirted in the form of fine droplets onto the substrate. The colour impression of a picture element of the substrate results from the absolute and relative amounts of the printing inks squirted onto the substrate in the area of that picture element, these amounts, which may, for example, be defined as the number of unit droplets (for example 0–16 droplets), being determined by appropriate electrical control of the jets. The jets are controlled in computer-assisted manner on the basis of a printing data table which, for each picture element of the printing original to be printed, contains the amounts of the individual printing inks necessary for the reproduction of the same, by printing techniques, under the given printing conditions. That printing data table thus corresponds to the totality of the grid percentages of a printing original in the above-described example of the grid screen printing process because, in the last analysis, those grid percentages or the grid screen printing stencils produced on the basis of those grid percentages only bring about the control of the amounts of the printing inks involved and accordingly constitute a measure of the amounts of the printing inks involved. Owing to this direct correspondence between the grid percentages and the amounts, the principles of the process according to the invention which are described above with reference to the grid screen printing process can be transferred very readily to the ink-jet process. In the ink-jet process, the grid percentages are simply replaced by the printing data table or the amounts of the individual printing inks contained therein both in the case of the design to be reproduced and in the case of the colour atlas. The actual printing operation, that is to say, the steps following the production of the printing data table (the printing of the substrate by means of an ink-jet apparatus on the basis of the said printing data table) is just as standardized as the production of the grid screen printing stencils on the basis of the grid percentages, and the printing in the screen printing apparatus itself.

In the case of the above-described visual evaluation of the printing original and the entering of the corresponding grid percentages in the control computer 53 of the grid film exposure apparatus 5 or in an analogous device in the case of ink-jet printing or another printing process, for reasons of practicability the size selected for the image areas of the printing original will not be too small; in particular, image points of the same colour tone will be combined to form relatively large zones. A further possibility is to select from the whole printing original only a few characteristic image areas that are especially important or critical for the colour impression and to carry out accurate correction measures, that is to say, the determination of the necessary grid percentages or amounts of the printing inks involved on the basis of the colour atlas, for those areas only. The other areas can accordingly then be corrected or treated approximately, for example analogously to the tone value variation in the colour atlas. There are numerous possible procedures known in the art and it is not necessary to give the person skilled in the art any further explanation in this connection.

The limitations of conventional methods in the case of printing on textile substrates are overcome by the process according to the invention. In particular, it is thereby possible to print each picture element of the design with the optimum combination of printing inks and thus on the one hand to permit special effects, which have hitherto been difficult to produce, and the printing of critical colour tones and, on the other hand, to obtain, with a relatively small total number of printing inks, a brilliancy of the colour impressions that has never before been achieved.

What is claimed is:

1. A process for transferring a multicolored image of any original onto a textile substrate by printing comprising the steps of:

(a) printing a color atlas on a test substrate, which test substrate has the same composition as the textile substrate, wherein the color atlas comprises color charts that are composed of color fields wherein specified volumes of up to three selected printing inks are printed one on top of the other under specified printing conditions, which selected printing inks are selected from a set of printing inks comprising at least three printing inks;

(b) dividing said multicolored image of the original into image areas;

(c) determining a color impression for each of the image areas of the original according to a color measuring system as color value data wherein the color measuring system measures color coordinates in the CIE-LAB color coordinate system or the CIE-LUV color coordinate system;

(d) determining the relative volumes of each of the selected printing inks required to reproduce the color impression of each image area by comparing the color value data of the color impression of the image element to the color value data of the color fields;

(e) establishing an area on the textile substrate which corresponds to each of the image areas of the original;

(f) producing a copy of the multicolored image of the original on the textile substrate by printing the area of the textile substrate corresponding to each image area of the original with the relative volumes of the selected printing inks determined in step (d), under printing conditions that are the same as the specified printing conditions of step (a), in order to reproduce the color field corresponding to the color impression of each image area on the area of the textile substrate corresponding to the image area of the original.

2. A printing process of claim 1 wherein the grid screen printing stencils are prepared by means of a grid film exposure system.

3. A printing process of claim 2, wherein the color value data of the picture elements of the printing original is determined automatically by photoelectric scanning and the grid percentages of the grid screen printing stencils are determined from the color value data.

4. A printing process of claim 1, wherein the printing inks of the set of printing inks are selected such that the color fields produced by printing the specified volumes of up to three of the printing inks one on top of the other do not overlap and such that they substantially fill the color space when taken together.

5. A process of claim 1, wherein the color impression of each image area and each color field is defined according to a color measuring system as color value data by scanning with a photoelectrical scanning device, step (d) is carried out by comparing the color value data of the color impression of the image area to the color value data of the color fields and the copy of the multicolored printing original is produced on the textile substrate by means of a multicolor ink-jet grid printing process.

6. A printing process of claim 5, wherein there is a maximum of three selected printing inks.

7. A printing process of claim 5, wherein the color fields have a substantially uniformly graded tone value variation.

8. A printing process of claim 5, wherein printing inks of the set of printing inks are selected such that the color fields produced by printing the specified volumes of up to three of the printing inks one on top of the other do not overlap and such that they substantially fill the color space when taken together.

9. A process for transferring a multicolored image of any original onto a textile substrate by printing comprising the steps of:

(a) printing a color atlas on a test substrate, which test substrate has the same composition as the textile substrate, wherein the color atlas comprises color charts that are composed of color fields wherein at least two selected printing inks are printed one on top of the other under specified printing conditions using grid screen printing stencils having a specified grid percentage, which selected printing inks are selected from a set of printing inks comprising at least three printing inks;

(b) dividing said multicolored image of the original into picture elements;

(c) determining a color impression for each of the picture elements of the original according to a color measuring system as color value data wherein the color measuring system measures color coordinates in the CIE-LAB color coordinate system or the CIE-LUV color coordinate system;

(d) determining the relative grid percentage of the grid screen printing stencil of each of the selected printing inks required to reproduce the color value data of the color impression of each picture element by comparing the color impression of the picture elements to the color value data of the color fields;

(e) establishing an area on the textile substrate which corresponds to each of the picture elements of the original;

(f) producing a copy of the multicolored image of the original on the textile substrate by printing the area of the textile substrate corresponding to each picture element of the original with grid screen printing stencils having the grid percentages determined in step (d), under printing conditions that are the same as the specified printing conditions of step (a), in order to reproduce the color field corresponding to the color impression of each picture element on the area of the textile substrate corresponding to the picture element of the original.

10. A printing process of claim 9, wherein there is a maximum of three selected printing inks.

11. A printing process of claim 9, wherein the color fields have a substantially uniformly graded tone value variation.

12. A printing process of claim 9, wherein the printing inks of the set of printing inks are selected such that the color fields produced by printing up to three of the printing inks one on top of the other do not overlap and such that they substantially fill the color space when taken together.

* * * * *